C. L. SCHNEIDER.
LAWN EDGER.
APPLICATION FILED JULY 1, 1916.
1,214,597.
Patented Feb. 6, 1917.
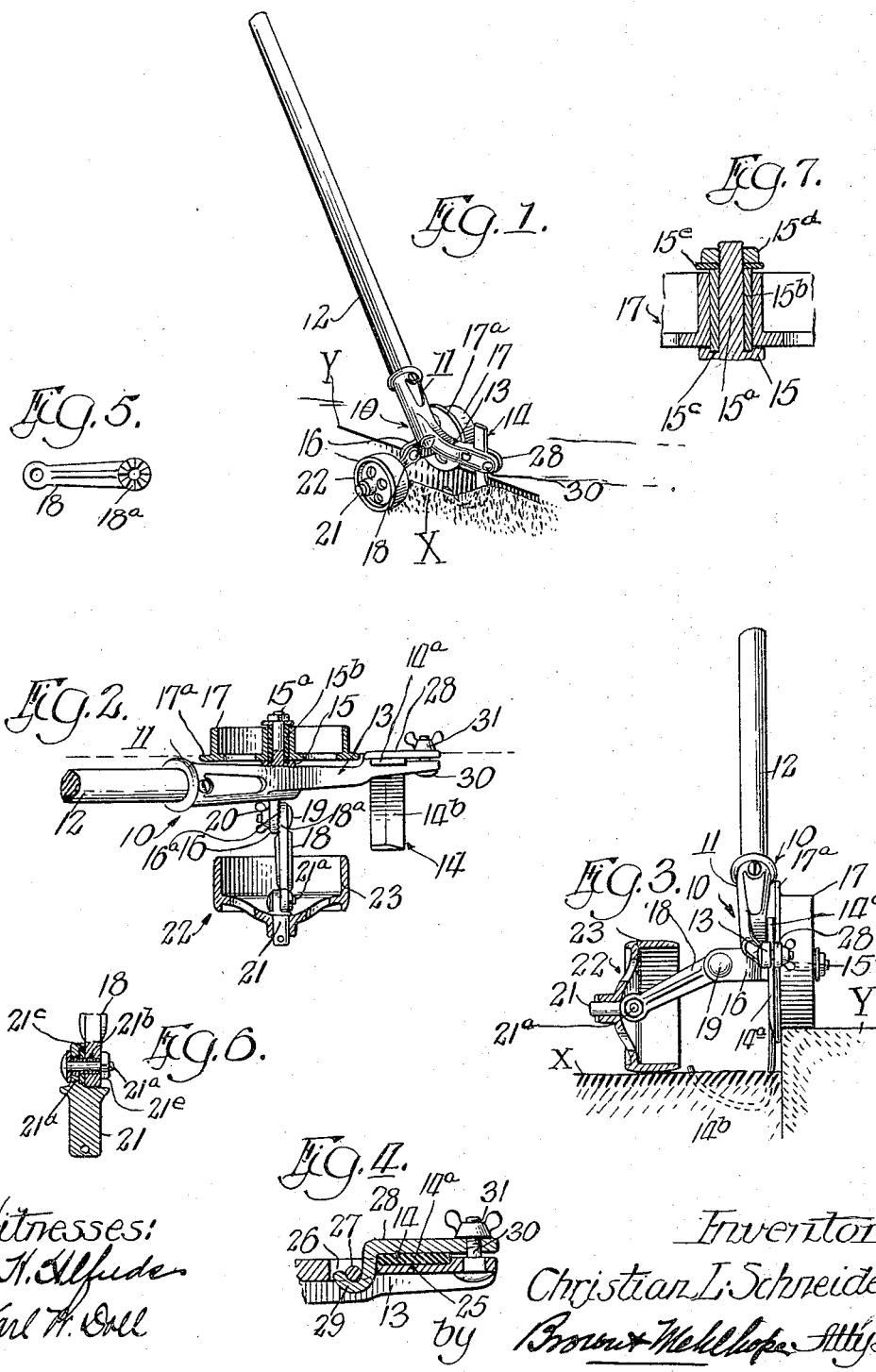
Witnesses:
F. H. Alfuda
Karl H. Orl
Inventor
Christian L. Schneider
by Brown & Mehllope Attys

UNITED STATES PATENT OFFICE.

CHRISTIAN L. SCHNEIDER, OF DAVENPORT, IOWA.

LAWN-EDGER.

1,214,597.　　　　Specification of Letters Patent.　　Patented Feb. 6, 1917.

Application filed July 1, 1916. Serial No. 107,084.

*To all whom it may concern:*

Be it known that I, CHRISTIAN L. SCHNEIDER, a citizen of the United States, and a resident of Davenport, in the county of Scott and State of Iowa, have invented certain new and useful Improvements in Lawn-Edgers; and I do hereby declare that the following is a full, clear, and exact description thereof, reference being had to the accompanying drawings, and to the letters of reference marked thereon, which form a part of this specification.

This invention relates to improvements in lawn edgers and consists of the matters hereinafter described and more particularly pointed out in the appended claims.

The object of the invention is to provide a simple and efficient device, by means of which lawns, adjacent walks and driveways, may be "trimmed" or "edged" and a trough provided in the lawn near the walks or driveways for the purpose of drainage.

Other objects as well as the several advantages of my invention will appear as I proceed with my specification.

In the drawings: Figure 1 represents a view in perspective of my improved lawn edger as it appears when being used for its intended purpose. Fig. 2 represents a top plan view thereof on an enlarged scale and with both of the wheels shown in section. Fig. 3 represents a front elevational view of the same. Fig. 4 represents a detail sectional view on a further enlarged scale, and will be more specifically referred to as I proceed with my specification. Fig. 5 represents a view in side elevation of one of the wheel supporting arms and will be more specifically referred to later. Figs. 6 and 7 represent detail sectional views on an enlarged scale and will be more specifically referred to later.

Referring now in detail to that embodiment of my invention as illustrated in the accompanying drawings, 10 indicates as a whole, a somewhat irregular shaped bracket casting which provides the main body part of my improved lawn edger. Said bracket casting includes an upwardly and rearwardly inclined socket member 11 which is adapted to receive a handle 12, and a horizontally disposed arm 13 which projects forwardly from the bottom end of the socket, in a plane to one side of the median line thereof. This arm carries a knife 14 at its free end, in a manner and for a purpose soon to appear. A boss 15 having a stud 15$^a$ projects laterally from that side of the bottom end of the socket adjacent the arm 13, and on the opposite side of said socket, in line with the stud 15$^a$ is provided a laterally projecting lug 16.

A wheel 17 having a radial flange 17$^a$ on its inner face is journaled on a bushing 15$^b$ mounted on the stud 15$^a$. Said bushing projects at its inner end into an annular groove or seat 15$^c$ in the boss 15 and is secured against endwise and rotative movement on said stud by reason of engagement of a nut 15$^d$ and associated washer 15$^e$ (see Fig. 7). The wheel 17 is adapted to travel in guided engagement upon the edge of the walk or driveway adjacent the lawn by reason of its flange when the device as a whole is used for its intended purpose. Pivotally connected to the lug 16 is an extension arm 18 (see Fig. 5) which is capable of vertical angular adjustment relative to said lug. The engaging surfaces of the said lug and arm are "rosetted" as indicated at 16$^a$ and 18$^a$ respectively, and a bolt 19 passes through alined holes in said arm and lug, a fly nut 20 being associated with said bolt to clamp the arm in the desired adjusted position. To the outer end of the arm 18 is pivotally connected a bearing stud 21 which is free to "float" in the vertical plane of the lug 16. A bolt 21$^a$ surrounded by a bushing 21$^b$ (see Fig. 6) provides the pivotal connection between said arm 18 and stud 21 and a spring washer 21$^c$ located in a recess 21$^d$ in the inner engaging face of said stud 21 prevents a too free floating action of said stud 21 relative to the arm 18. A nut 21$^e$ is threaded upon the bolt 21$^a$ for the purpose well known. A broad flat rimmed, auxiliary supporting wheel 22, of a diameter approximating that of the wheel 17 before mentioned, is journaled on said stud with its rim 23 overhanging or inclosing the pivotal connection between the arm 18 and the bearing stud 21. This wheel travels upon the lawn and is capable of adjusting itself to the inequalities of the lawn adjacent the walk or driveway, by reason of the floating pivotal connection of the bearing stud 21 to the arm 18. As it is well known the surface of some lawns are flush with the walks or driveways while the surface of other lawns are in a plane either above or below said walks or driveways. This difference may be compensated for by a vertical angular adjustment of the arm 18 relative to the lug 16.

The knife 14 carried by the arm 13 is adjustably fixed thereto as follows:—As shown, said knife is made of a flat bar bent into the form of the letter J. It comprises a long leg 14$^a$ and a curved bottom end 14$^b$ which is provided with a front cutting edge. In the outer surface of said arm 13 near its free end, is formed a recess 25 (see Figs. 2 and 4) which is adapted to receive the long leg 14$^a$ of the knife 14, with one face of said leg projecting beyond said face of said arm. To the rear of said recess is formed a rectangular, transversely extending hole 26 in which is located an upright web or post 27. A clamping bar 28 (see Fig. 4) having a hooked end 29 which is adapted for engagement with the post 27 is provided, to engage the projecting face of the knife leg 14$^a$, and a bolt 30 is extended through the free end of said bar and arm. A fly nut 31 is threaded upon the bolt to hold said bar in its operative clamping position relative to the knife.

In operation, the knife 14 cuts a strip of sod from that edge of the lawn adjacent the walk or driveway, and this strip of sod may be easily removed to leave a groove or trough along said edge of the lawn. The depth of this groove may be varied by loosening the clamping bar 28 and adjusting said knife vertically and again clamping it in the new adjusted position.

The operation of the improved lawn edger is as follows:—In the drawings, the surface of the lawn X is shown as being located in a plane a short distance below the surface of the sidewalk Y. When it is desired to "edge" such a lawn, the arm 19 is adjusted to the proper vertical angular position which will bring the wheel 22 to bear with its rim 23 upon the lawn and so that said wheel will stand in a plane parallel with the wheel 17, when the same is on the sidewalk Y. The knife 14 is adjusted vertically relative to the arm 13, so as to give the desired depth of trough to be cut. The operator now grasps the handle 12 and places the main supporting wheel 17 upon the walk or driveway with the outer face of its flange 17$^a$ in engagement with the upright edge of the walk or driveway. The handle is tilted upwardly toward the perpendicular so as to present the cutting edge of the knife to the top surface of the lawn in the plane of the trough or groove to be cut, and a downward and forward pressure is exerted on the handle to enter the knife into the lawn for the initial or beginning cut of the trough. The handle is then swung downwardly and rearwardly until the arm 13 is in its approximately horizontal position, when the edger is pushed forwardly in the usual manner of operating lawn edgers. The knife will produce a cut of a cross section corresponding to the curved part 14$^b$ of the knife, the sod so cut of course being afterward removed. The guiding engagement of the flange 17$^a$ of the wheel 17 with the edge of the walk will maintain the edger in a straight path as it is moved along the walk or driveway so as to present a smooth straight cut edge for the lawn. This improves the appearance of the lawn, and at the same time provides a drainage trough, so that the walk or driveway will be kept free from surplus water.

My improved edger possesses advantages, not apparent in lawn edgers as now made. The depth of the edge defining trough may be regulated as desired and it is just as easily operated when the lawn surface is above or below the plane of the walk or driveway as when the lawn surface is in the same plane as that of the walk. The floating manner in which the wheel 22 is secured, permits the same to travel over inequalities on the lawn without tending to pull the edger as a whole from the desired path.

The edger comprises but a comparatively few number of parts and these are so constructed as to withstand such strain as may be imposed upon them.

While in describing my invention I have referred to certain details of mechanical construction and arrangement of parts, I do not wish to be limited thereto except as may be pointed out in the appended claims.

I claim as my invention:—

1. A device of the kind described comprising a bracket casting, which includes a forwardly extending arm, a vertically adjustable cutting device carried by said arm, means for securing a handle to the bracket casting, a main and an auxiliary supporting wheel mounted on said bracket casting, one of said wheels being capable of a floating movement in a direction transverse to its path of travel.

2. A device of the kind described comprising a bracket casting, which includes a socket member and a forwardly extending arm, a handle member adapted for engagement in said socket member, a vertically adjustable J shaped knife carried by said arm at its end, a main supporting wheel journaled on one side of said bracket casting, a transversely extending lug made integral with but on the opposite side of said bracket casting, an arm pivoted at one end to said lug and capable of angular adjustment relative thereto, a bearing stud pivoted to the free end of said arm and an auxiliary supporting wheel mounted on said bearing stud.

3. A device of the kind described comprising a bracket casting, which includes a socket member and a forwardly extending arm, a handle member adapted for engagement in said socket member, a vertically adjustable J shaped knife carried by said arm at its end, a laterally extending stud carried on one side of said bracket casting, a main supporting wheel journaled on said stud, a transversely extending lug carried on the other side of said bracket casting, an arm pivotally attached to said lug, said arm being capable of adjustment relative to said lug, means locking said arm to said lug in the desired adjusted position, a bearing stud carried by said arm and an auxiliary supporting wheel mounted on said bearing stud.

4. A device of the kind described comprising a bracket casting which includes an upwardly and rearwardly inclined socket member and a normally horizontally disposed forwardly extending arm, said arm having a recess near its end, a cutting device mounted in said recess and a clamping bar carried by said arm adjacent said recess to clamp said knife in position therein, a stud projecting laterally from one side of said bracket casting, a main supporting wheel journaled on said stud, a lug projecting laterally from the opposite side of said bracket casting, an arm pivotally and adjustably connected to said lug, means locking said arm in the desired adjusted position, a bearing stud loosely pivoted to the end of said laterally extending arm and an auxiliary supporting wheel journaled on said bearing stud.

In testimony, that I claim the foregoing as my invention I affix my signature in the presence of two witnesses, this 23d day of June A. D. 1916.

CHRISTIAN L. SCHNEIDER.

Witnesses:
 Louis G. Bein,
 Wm. Froeschle.

Copies of this patent may be obtained for five cents each, by addressing the "Commissioner of Patents, Washington, D. C."